United States Patent Office 3,046,952
Patented July 31, 1962

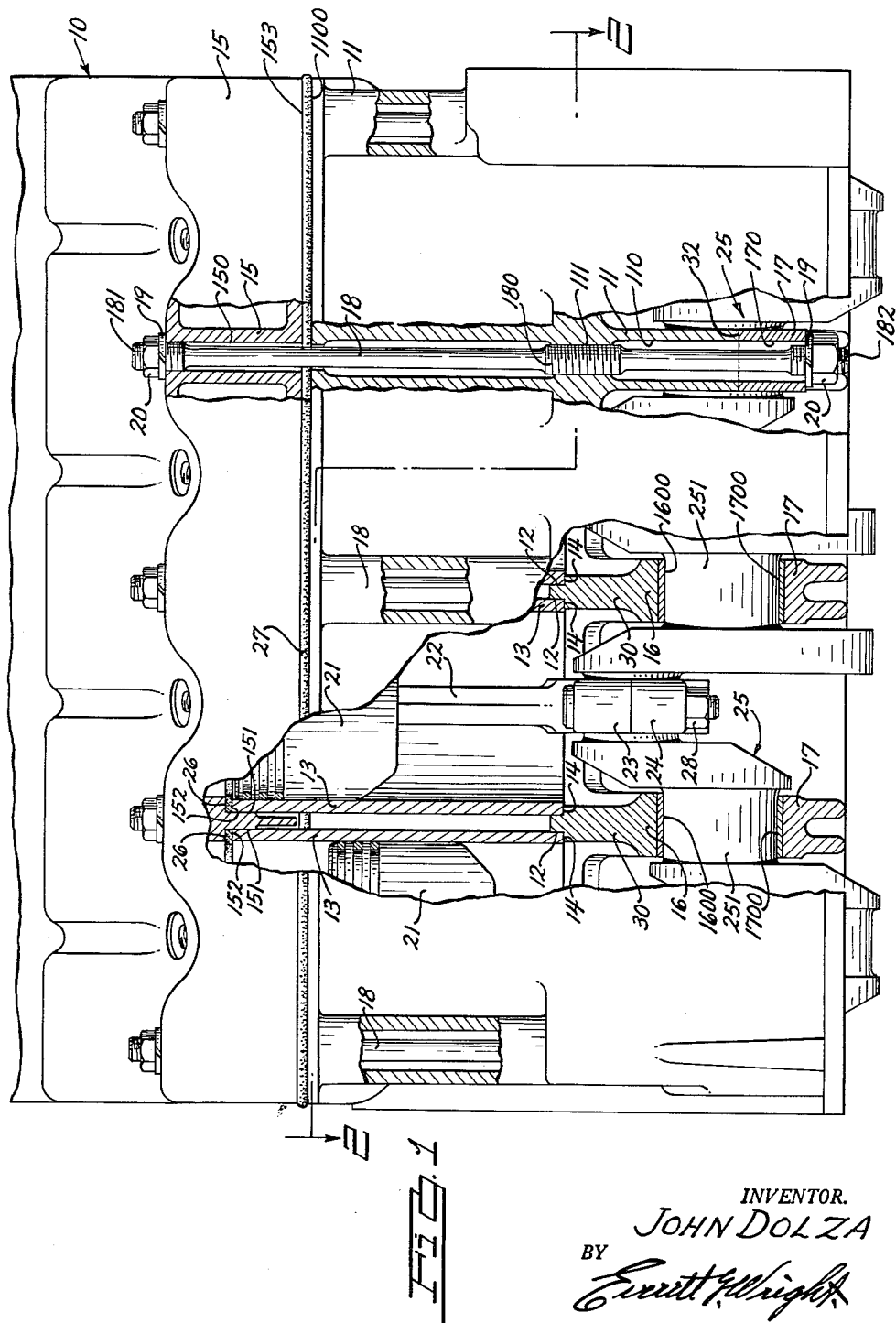

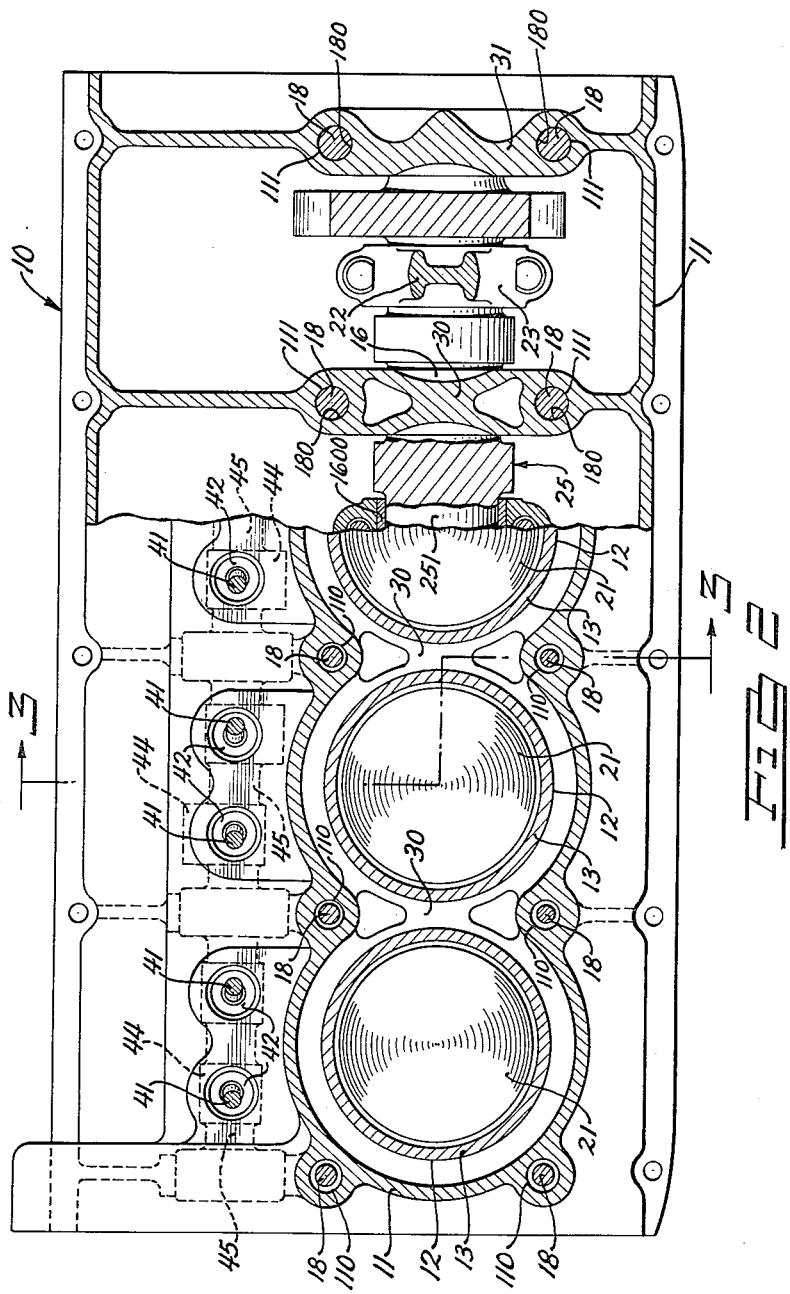

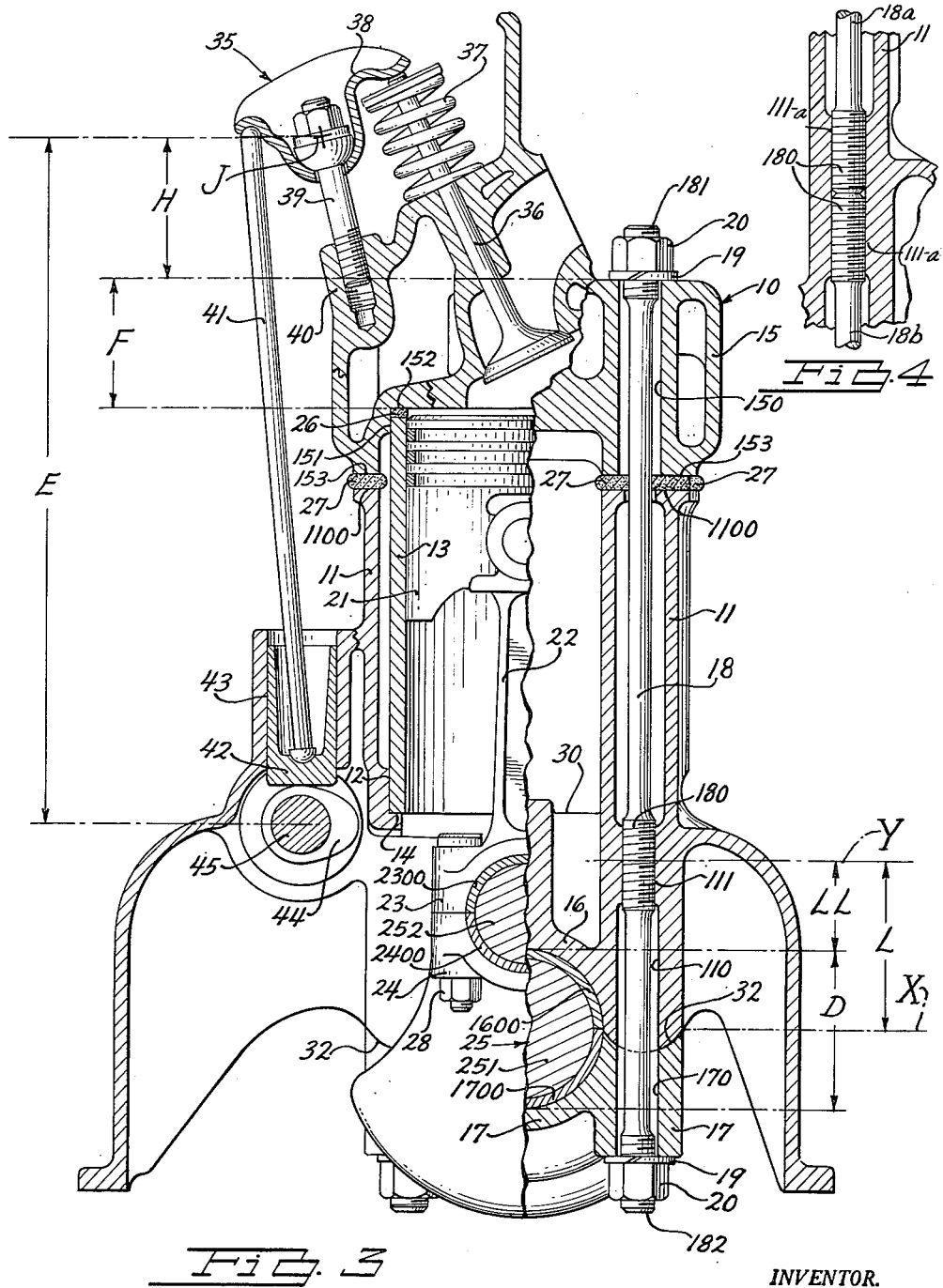

3,046,952
INTERNAL COMBUSTION ENGINES
John Dolza, 15080 Fenton Road, Fenton, Mich.
Filed Feb. 11, 1960, Ser. No. 8,091
2 Claims. (Cl. 121—194)

This invention relates to internal combustion engines including an engine block assembly consisting of a cylinder block of aluminum or other light relatively high expansion alloy, cylinder liners and a cylinder head of selected materials as hereinafter set forth, and main bearing caps of cast iron or other relatively low expansion material, all arranged and assembled together by through steel studs anchored to the cylinder block in location and manner to provide an effective unitary assembly having controlled expansion to maintain proper operating clearances of main engine bearings and/or engine valve train mechanisms whereby to compensate for the usual uneven expansion of engine block assemblies incorporating major elements of different coefficients of expansion.

A primary object of the invention is to provide in an internal combustion engine an engine block assembly including an engine block of aluminum or other material having a relatively high coefficient of expansion wherein the engine block assembly consists of a novel arrangement of elements including main bearing caps of cast iron or other material having a relatively low coefficient of expansion and through steeel assembly bolts which engine block assembly avoids excess or undesirable operating clearances at the main engine crank-shaft bearings.

A further object of the invention is to prevent excessive main bearing over-all expansion in an engine block assembly including an engine block cast of material such as aluminum alloy or other light metal alloys having a relatively high coefficient of expansion as compared to other elements cast iron or steel generally employed in the engine block assembly.

A further object of the invention is to control expansion in an engine block assembly including an engine block cast of material such as aluminum alloy or other light metal alloys having a relatively high coefficient of expansion as compared to cast iron or other materials employed in the engine block assembly having a relatively low coefficient of expansion whereby to maintain proper clearances in the engine valve train mechanism when the engine is heated up from its cold-non-operating temperature to its normal operating temperature.

A further object of the invention is to provide in a light weight internal combustion engine having a multi-part engine block assembly of aluminum alloy and/or other material having a relatively high coefficient of expansion with respect to the steel crankshaft of the engine; the said engine block assembly, for example, including an aluminum or other light metal alloy cylinder block, steel cylinder liners, a cylinder head of aluminum or other light metal alloy or cast iron, and main bearing caps of cast iron or the like having a relatively low coefficient of expansion, all secured together by through steel bolts disposed substantially axially of the cylinder bores, the said cylinder block having therein transverse beam members located at and above each said main bearings, the said through steel bolts being anchored in said cylinder block substantially opposite the ends of said transverse beam members and having their ends extending from the cylinder head and the main bearing caps, and means on the ends of said through steel bolts engaging the said cylinder head and said main bearing caps securing the cylinder block elements into a substantial integral whole restraining normal expansion of the cylinder block elements longitudinally of the cylinder bores thereof in a manner to assure the maintenance of main bearing and valve train operating clearances within proper tolerances during engine operation.

Another object of the invention is to provide in an engine block assembly of the aforesaid type wherein the cylinder head and cylinder liners are of different coefficients of expansion whereby to create an expansion system between the location of the through bolt anchorages and the top of the cylinder head wherein the expansion of the cylinder head and the cylinder liners acting as a unit is greater than the expansion of the through bolts.

Another object of the invention is to provide in an engine block assembly of the type aforesaid a cylinder head of one coefficient of expansion and cylinder liners or block of another coefficient of expansion that will expand more than the through bolts above their anchorage in the cylinder block at the ends of the transverse beams and produce a force limiting the upward normal vertical expansion of the said beams, which force combined with the restraint provided by the main bearing caps and the through bolts below their anchorage in the cylinder block controls the vertical expansion of the main bearings substantially equal to the expansion of the main crankshaft journals.

Still another object of the invention is to provide in an engine block assembly of the type aforesaid employing main bearing caps of cast iron or the like having a relatively low coefficient of expansion and cylinder block of aluminum alloy or the like having a relatively high coefficient of expansion, an interlock between the main bearing caps and the cylinder block at the main bearing blocks thereof adapted to cause the main bearing caps to restrain the main bearing blocks laterally, the said interlock comprising interlocking surfaces of a relatively large curvature and formed to maintain stresses at the interlock substantially in compression to reduce the tendency of fatigue failure of the cylinder block at the interlock.

Other objects of the invention will become apparent by reference to the following detailed description taken in connection with the accompanying drawings, in which:

FIG. 1 is a side elevational view of a cylinder block assembly embodying the invention.

FIG. 2 is a horizontal sectional view taken on the line 2—2 of FIG. 1.

FIG. 3 is an enlarged vertical sectional view taken on the line 3—3 of FIG. 2.

FIG. 4 is a fragmentary vertical sectional view showing a two-part through bolt and through bolt anchorage that may be employed in lieu of one piece through bolts illustrated elsewhere throughout the drawings.

Referring now to the drawings wherein like reference characters refer to like and corresponding parts throughout the several views, an improved internal combustion engine block assembly 10 illustrative of the invention, but not to be considered limiting, is disclosed consisting of a cylinder block 11 preferably of aluminum or other light metal alloy having a relatively high coefficient of expansion as compared to cast iron or steel, cylinder bores 12 in said cylinder block 11 accommodating cylinder liners 13 preferably of cast iron or steel seated on an annular flange or shoulder 14 formed at the lower end of each said cylinder bore 12, a cylinder head 15 of aluminum or other light metal alloy or cast iron, main bearing blocks 16 formed integrally in said cylinder block 11 preferably between each cylinder bore 12 and at the ends of said cylinder block 11, and main bearing caps 17 preferably of cast iron, malleable iron or other material having a like relatively low coefficient of expansion. The main bearing blocks 16 of the cylinder block 11 and main bearing caps 17 are suitably lined at 1600 and 1700 in the usual manner to accommodate anti-frictionally the main journals 251 of the engine crankshaft 25.

The cylinder head 15 is provided with shallow bores 151 located to align with the bores 12 in the cylinder block 11 to receive the upper ends of the cylinder liners 13. The said cylinder head 15 is provided with an annular seat 152 at the inner end of each of the shallow bores 151 therein. A relatively hard gasket 26 is provided between the said annular seat 152 of the cylinder head 15 and the upper peripheral edge of the subjacent cylinder liner 13, while a relatively softer gasket 27 is provided between the peripheral flange 153 of the cylinder head 15 and the peripheral flange 1100 of the cylinder block 11.

The cylinder block 11 is provided with transverse beam members 30 and 31 thereacross located respectively between cylinder bores 12 therein and at the extreme ends of the cylinder block 11. These transverse beams 30 and 31 are disposed at and just above the main bearing blocks 16 and are formed integral therewith. The cylinder block 11, cylinder head 15 and main bearing caps 17 are through bored or cored at 110, 150 and 170 respectively to accommodate through steel bolts 18 having a threaded anchorage boss 180 thereon intermediate the ends thereof where they are fixed to the engine block 11 by threading them thereto at a threaded counterbore or through bolt anchorage 111 aligned with each bore 110 in the cylinder block 11. The said through bolt anchorages 111 are located at approximately the elevation of the transverse beam members 30 and 31 of the cylinder block 11 as best shown in FIG. 3. As illustrated in FIG. 4, the through bolts shown elsewhere throughout the drawings as being one piece through bolts 18 may be divided into upper and lower through bolt sections 18–a and 18–b, each through bolt section 18–a and 18–b being threaded into a through bolt anchorage 111–a which would be somewhat longer but located similarly to the aforementioned location of the said through bolt anchorages 111. The ends of the through bolts 18 are threaded at 181 and 182 and extend respectively above the top of the cylinder head 15 and below the main bearing caps 17. A washer 19 and nut 20 on the upper and lower ends of the through bolts 18 are employed to pull and to secure the engine block assembly 10 into an integral whole. Obviously, the through bolts 18 may be anchored to the cylinder block 11 opposite the ends of the transverse beams 30 and 31 by any suitable means other than the threaded through bolt anchorage 111 hereinbefore described.

The foregoing securement of the engine block assembly 10 draws the cylinder head 15 in sealed relationship onto the upper ends of the cylinder liners 13 and against the peripheral flange 1100 of the cylinder block 11 with hard and soft gaskets 26 and 27 respectively therebetween, and at the same time the cylinder head 15 maintains the cylinder liners 13 seated on the annular flange 14 at the lower end of each cylinder bore 12, and the main bearing caps 17 are drawn tightly in place. A hard gasket, not shown, may be placed between the bottom of the cylinder liners 13 and the said annular flange 14 at the lower end of the cylinder bore 12. The anchorage of the through securing bolts 18 opposite the ends of the transverse beams 30 and 31 provides a control over the expansion of engine block assemblies of the invention at the main bearings so as to be nearly equal to that of steel, and also causes the support point J of the engine valve train mechanism 35 to expand and contract thermally parallel to the longitudinal axis of the cylinder bores at substantially the same rate as the expansion of the valve train mechanism.

Referring now particularly to FIG. 3, the lateral or horizontal expansion of the main crankshaft bearings each consisting of a main bearing block 16 cast integral with the cylinder block 11 and its shell or liner 1600 and the main bearing cap 17 and its shell or liner 1700 is controlled by interlocking the main bearing cap 17 with the main bearing block 16. Inasmuch as the main bearing blocks 16 are cast integral with the cylinder block 11 of an aluminum alloy or other material, they have a relatively high coefficient of expansion. Excessive lateral expansion of the said main bearing blocks 16 is controlled by providing a proper interlock 32 between each said bearing block 16 and its main bearing cap 17, the latter being of cast iron or other material having generally the same coefficient of expansion as the main crankshaft journals 251 of the engine crankshaft 25. The interlock 32 is preferably of a selected shape employing relatively large radii curvatures in the mating parts of the bearing block 16 and the bearing cap 17 arranged so that, when the bearing cap 17 is pulled tightly against the bearing block 16 by the lower ends of the through bolts 18, the bearing cap 17 restrains the lateral expansion of the lower portion of the bearing block 16. The use of such an interlock 32 not only prevents excessive lateral expansion of the bearing block portion of the main crankshaft bearings, but also causes the stresses at the interlock to be substantially all in compression thereby to reduce the tendency of fatigue failure at the interlock.

Pistons 21 are reciprocatingly mounted in the cylinder bores 12 of the cylinder block 11, and each piston 21 is connected in a conventional manner to a crank 252 of the engine crankshaft 25 by means of a connecting rod 22 having a connecting rod bearing block 23 and a connecting rod bearing cap 24. Each connecting rod bearing block 23 and its bearing cap 24 are suitably lined at 2300 and 2400 respectively in the usual manner to accommodate anti-frictionally a crank 252 of the engine crankshaft 25. The connecting rod bearing caps 24 are secured to the connecting rods by means of bolts 28 extending through the connecting rod bearing blocks 23 and the said crank bearing caps 24.

The valve train mechanism generally designated by the numeral 35 and best shown in FIG. 3 is of conventional construction and may consist of a poppet valve 36, either intake or exhaust, a valve spring 37 normally holding the said valve 36 closed, a rocker arm 38 suitably pivotally supported by an adjustable rocker arm bearing stud 39 threaded into an interiorly threaded boss 40 on the cylinder head 15 of the engine block assembly 10, and a push rod 41 supported in a sleeve or other type valve lifter 42 reciprocatingly mounted in a bore 43 in the cylinder block 11. The push rod is lifted in the usual manner by an engine timing cam 44 mounted on the camshaft 45 against pressure of the valve spring 37 applied thereto through the rocker arm 38. The engine valve train mechanism 35 is usually formed of steel or the like having a co-efficient of expansion less than the coefficient of expansion of the aluminum or other light metal alloy cylinder block 11.

To more fully explain the invention, but not to be considered limiting, the following two advantages attained in engine block assemblies 10 embodying the invention will be described; namely, (a) the vertical diameter D of the main crankshaft bearings each consisting of a main bearing block 16, a main bearing cap 17 and shells or liners 1600 and 1700, is prevented from expanding materially more than the diameter of the main crankshaft journals 251 of the crankshaft 25, and (b) valve train clearances are maintained nearly constant at both low and high engine operating temperatures. These features assure smooth trouble-free engine operation by maintaining approximate constant crankshaft journal to main bearing clearance, and by preventing malfunctioning of the engine valves due to excessive or uneven expansion of the engine block in respect to the valve train mechanism.

With respect to item (a), the control of the vertical expansion of the diameter D of the main crankshaft bearing consisting of the main bearing block 16 and main bearing cap 17, it will be noted that the main bearing block 16 is an integral part of the cylinder block 11 cast of aluminum or other light metal alloy having a relatively high coefficient of expansion, whereas the main bearing cap 17 is preferably of cast iron or malleable iron or other relatively low coefficient of expansion material. As indicated in FIG. 3, the horizontal plane X passes through the horizontal center line of the crankshaft 25. The vertical center of the threaded anchorage boss 180 of each through bolts 18 that is threaded or otherwise fixedly secured in a through bolt anchorage 111 of the cylinder block 11 is designated by the character Y in FIG. 3. In an engine block assembly 10 embodying the invention, the portion L between the horizontal plane X and the through bolt anchorage Y for the through bolts 18 has a lower coefficient of expansion than the unrestrained central portion of the beams 30 and 31. The said central portion of the beams 30 and 31 and the main bearing blocks 16 have a downward vertical component of expansion which is in the opposite direction to the expansion of the through bolt anchorage 111 at Y which surrounds the through bolts 18. Consequently, in practicing the invention, a proportion of L to LL and the relative rigidity of the hereinbefore described system will be selected so that the vertical diameter of the main bearings has the thermal expansion desired; namely, substantially the same as the main crankshaft journals.

If desired, the vertical expansion of the main bearings can be handled effectively without the contributing use of that portion of the cylinder block construction above the transverse beams 30 and 31 and above the through bolt anchorages 111. This is practicable since the through bolts 18 are made of steel and have a lower coefficient of expansion than the aluminum or other light metal alloy out of which the cylinder block 11 is cast, they will restrain the thermal expansion of the cylinder block along the longitudinal axis of the said through bolts 18 to a value below that which would have occurred from an unrestrained aluminum or other light metal alloy cylinder block. However, the beams 30 and 31 have no restraint along their vertical axis, which axis is parallel to and located transversely between the vertical axes of pairs of through bolts 18. Because of the restraint offered below the through bolt anchorage 111 by the said through bolts 18 anchored at the through bolt anchorage 111, it follows that the upper half of the vertical diameter D of the main bearings will have only a thermal expansion that is equivalent to the expansion of the cylinder block 11 calculated on a length equal to the difference between the distance L along the axis of the through bolts and the distance LL along the axis of the main bearing, which closely approximates the thermal expansion of the main journal 251 of the crankshaft 25, and, for all practical purposes, a satisfactory control of the vertical expansion of the diameter D of the main crankshaft bearing block 16 and each main bearing cap 17 is provided whereby to avoid excessive clearances between the main crankshaft journal 251 and its bearing block 16 and cap 17.

With regard to (b), the maintaining of valve train clearances, the portion E of the valve lifter train mechanism 35 including the timing cam 44, cam shaft 45, valve lifters 48, and push rods 41 is of steel having approximately the same coefficient of expansion as that of cast iron. The cylinder head 15 is basically supported on steel or cast iron liners 13, and is held in assembly to the cylinder block 11 by the upper portion of the through bolts 18 located above the through bolt anchorages 111. If the cylinder head 15 is of aluminum or other light metal alloy, its coefficient of expansion over the distance F is between that of aluminum and steel due to the effect of the through bolts 18 pulled tight above the said cylinder head 15 by the nuts 20 at the upper ends thereof. Therefore, the center J of the rocker arm 38 will move upwardly only very slightly when an engine block assembly embodying the invention is warmed up to its normal operating temperature from its cold unoperating temperature. This is because of the fact that the through bolts 18 are anchored in the cylinder block 11 at the through bolt anchorages 111 which are located approximately at the elevation of the bottom of the steel cylinder liners 13 seated on the annular flange or shoulder 14 formed at the lower end of each cylinder bore 12, and due to the use of hard gaskets 26 between the cylinder liners 13 and the cylinder head 15 and a relatively soft gasket 27 between the outer peripheral flange 1100 of the cylinder block 11 and the cylinder head 15.

Throughout the specification and claims, the several elements of the cylinder block assembly 10 are indicated as being of material either having a relatively low coefficient of expansion or of material having a relatively high coefficient of expansion. The through bolts 18, or alternately the two-piece through bolts 18–a and 18–b, are preferably of steel having a relatively low coefficient of expansion. Also, the main bearing caps 17 are of cast iron or malleable iron or the like having a relatively low coefficient of expansion. The cylinder block 11 and the cylinder head 15 are preferably cast of aluminum alloy or other material having a relatively high coefficient of expansion, and the cylinder liners 13 are preferably of cast iron or steel having a relatively low coefficient of expansion. However, any combination of materials having different coefficients of expansion may be employed in the cylinder block 11, cylinder liners 13 and cylinder head 15 provided such combination of elements when secured together by the steel through bolts 18 exert a downward force on the beams 30 and 31 cast integral with the cylinder block 11 responsive to the expansion of the system employed between the anchorages 111 of the through bolts 18 and the top of the cylinder head 15. It is evident that the hereinbefore mentioned downward force can also be produced by the employment of like materials utilizing different local engine operating temperatures to produce the desired expansion differentials as required.

The method and means herein disclosed for effectively controlling the expansion of internal combustion engine cylinder block assemblies incorporating major components having as high as a 3 to 1 ratio of the coefficient of expansion thereof or selected expansion differentials provides, in effect, a unitary cylinder block assembly having proper expansion and contraction characteristics which assures long trouble-free service from the moving parts of the engine together with a minimum of wear therebetween.

Although but a single embodiment of the invention has been disclosed and described herein, it is obvious that details of the method and means herein disclosed and described for effectively controlling the thermal expansion of an engine block assembly should not be considered limiting inasmuch as many changes may be made in the method steps and in the size, shape, arrangement, and detail of the various elements of the invention, all as defined by the appended claims.

I claim:

1. In an internal combustion engine, an engine block assembly comprising a cylinder block having cylinder bores therein, a cylinder head, main crankshaft bearing blocks cast integral with said cylinder block, and a main bearing cap for each said main bearing block, through bolts disposed substantially parallel to said cylinder bores securing said cylinder head, cylinder block and main bearing caps into a unitary assembly, transverse beams cast integral with said cylinder block at the top of the said main crankshaft bearing blocks, the said cylinder head, cylinder block and main bearing caps having through bores therethrough to freely accommodate said through bolts except at the opposite ends of said transverse beams, and means anchoring said through bolts to said cylinder block at the ends of said transverse beams, the cylinder block having a relatively high coefficient of expansion generally equivalent to that of aluminum alloy, and through bolts and main bearing caps having a relatively low coefficient of expansion substantially equivalent to that of steel, and interlocking means provided between the main bearing blocks and the main bearing caps consisting of mating curved surfaces of relatively large radii formed to laterally restrict the main bearing blocks against undue lateral expansion.

2. In an internal combustion engine including an engine block assembly, a crankshaft and main crankshaft bearings, said engine block assembly comprising a cast cylinder block of a light metal alloy such as an aluminum alloy having a coefficient of expansion greater than that of steel, said cylinder block having shouldered cylinder bores therein and formed between and adjacent said cylinder blores to provide arcuate main engine crankshaft bearing blocks, cylinder liners having a coefficient of expansion less than that of said cylinder block in said cylinder bores bearing on said shoulders, a cylinder head, and a main bearing cap for each main crankshaft bearing of a material having a coefficient of expansion substantilly equivalent to that of steel, said cylinder liners extending to the top of said cylinder block for engagement by said cylinder head when said engine block is assembled, transverse beams formed integral with and above said main bearing blocks, through bolts disposed substantially parallel to said cylinder bores extending through said cylinder block, said cylinder head and said bearing caps, means anchoring said through bolts to said cylinder block only at the opposite ends of the said transverse beams, and take-up nuts threaded on the outer ends of said through bolts securing said cylinder block, cylinder liners and bearing caps into an integral assembly, the mating portions of the main crankshaft bearing blocks and the main bearing caps being formed into longitudinally extending transversely curved interlocks having relatively large radii surfaces arranged to cause said main bearing caps to restrict the lateral expansion of the adjacent main bearing blocks.

References Cited in the file of this patent

UNITED STATES PATENTS

| | | |
|---|---|---|
| 1,299,709 | Hall | Apr. 8, 1919 |
| 1,560,927 | Wolf | Nov. 10, 1925 |
| 1,720,625 | Chorlton | July 9, 1929 |
| 1,836,498 | Pielstick | Dec. 15, 1931 |
| 1,860,769 | Buchi | May 31, 1932 |
| 1,972,752 | Balough | Sept. 4, 1934 |
| 2,018,612 | Good et al. | Oct. 22, 1935 |